United States Patent
Crawford et al.

(10) Patent No.: US 10,068,300 B2
(45) Date of Patent: Sep. 4, 2018

(54) INTELLECTUAL ASSET FAMILY CREATION

(71) Applicant: Anaqua, Inc., Boston, MA (US)

(72) Inventors: Kelly Crawford, Upton, WY (US); Denise Cheung, Wellesley, MA (US)

(73) Assignee: ANAQUA, INC., Boston, MA (US)

( * ) Notice: Subject to any disclaimer, the term of this patent is extended or adjusted under 35 U.S.C. 154(b) by 542 days.

(21) Appl. No.: 14/215,728

(22) Filed: Mar. 17, 2014

(65) Prior Publication Data

US 2014/0278727 A1 Sep. 18, 2014

Related U.S. Application Data

(60) Provisional application No. 61/787,683, filed on Mar. 15, 2013.

(51) Int. Cl.
 *G06Q 10/00* (2012.01)
 *G06Q 50/18* (2012.01)
 *G06Q 10/06* (2012.01)

(52) U.S. Cl.
 CPC ....... *G06Q 50/184* (2013.01); *G06Q 10/0633* (2013.01)

(58) Field of Classification Search
 None
 See application file for complete search history.

(56) References Cited

U.S. PATENT DOCUMENTS

| | | | | |
|---|---|---|---|---|
| 6,041,421 A | * | 3/2000 | Yamamoto | G11B 19/04 714/6.32 |
| 7,133,879 B1 | * | 11/2006 | Goldsmith | G06F 17/30722 |
| 2002/0138474 A1 | * | 9/2002 | Lee | G06Q 10/10 |
| 2003/0167253 A1 | * | 9/2003 | Meinig | G06F 17/30303 |
| 2004/0025048 A1 | * | 2/2004 | Porcari | G06Q 10/10 726/1 |
| 2004/0088332 A1 | * | 5/2004 | Lee | G06F 17/30011 |
| 2005/0086656 A1 | * | 4/2005 | Whitlock | G06F 9/52 718/1 |
| 2008/0068401 A1 | * | 3/2008 | Albrecht | G06F 17/30905 345/645 |

(Continued)

OTHER PUBLICATIONS

Al-Aali, Abdulrahman. Towards the (Strategic) Management of Intellectual Property: Retrospective and Prospective. California Management Review, Summer 2013, vol. 55, Issue 4, p. 15-30, 16. (Year: 2013).*

(Continued)

*Primary Examiner* — Stephanie Zagarella Delich
(74) *Attorney, Agent, or Firm* — Maschoff Brennan

(57) ABSTRACT

An example embodiment includes a method for creating a family of related intellectual asset (IA) records. The method may include obtaining IA data for a current filing. The method may include creating an IA record for the current filing. The method may include obtaining IA data for one or more related filings. The current filing and the one or more related filings belong to a family of intellectual assets. The method may also include preparing for creation of a plurality of IA records for the one or more related filings based on the IA data for the current filing and the IA data for the one or more related filings. The method may further include creating a plurality of new IA records for the one or more related filings.

16 Claims, 9 Drawing Sheets

(56) References Cited

U.S. PATENT DOCUMENTS

2008/0312940 A1* 12/2008 Marlett ............... G06Q 50/184
                                                    705/310
2012/0173523 A1*  7/2012 Cheung ................ G06Q 50/18
                                                    707/736
2013/0047066 A1*  2/2013 Lee .................. G06F 17/30011
                                                    715/229

OTHER PUBLICATIONS

Lucas, Carl. Visualization of Intellectual Property Visualization Framework Patent Maps Patent Trees. Les Annual Meeting, San Antonia, Texas. Oct. 24-27, 1999. pp. 18. (Year: 1999).*

* cited by examiner

INTELLECTUAL ASSET FAMILY CREATION

CROSS-REFERENCE TO RELATED APPLICATIONS

This patent application claims priority to and the benefit of U.S. Provisional Patent Application No. 61/787,683, filed Mar. 15, 2013, which is incorporated herein by reference in its entirety.

FIELD

Embodiments disclosed herein relate generally to related record creation. More particularly, some embodiments relate to creation of a family of intellectual asset records.

BACKGROUND

An intellectual asset management (IAM) system is used to schedule legal matters and manage aspects of intellectual property assets. Examples of intellectual property assets may include: patents, third party patents, trade secrets, publications, trademarks, third party trademarks, domain names, copyrights, and applications or filings thereof. An IAM system may support docketing and other related activities in the full lifecycle of intellectual property assets, such as invention disclosure submission, trademark search requests, multi-party collaboration, document and e-mail management, configurable business workflow rules, and business intelligence tools, among other features. An IAM system may also support indication and management of intellectual asset family relationships, such as parent and sibling patent applications, parallel foreign filings, national phase filings for the Patent Cooperation Treaty (PCT), continuation applications, divisionals, provisionals, etc. An IAM system provides visibility and access to internal and external participants in the intellectual asset management process—for example, attorneys, agents and paralegals, researchers and engineers, portfolio managers, marketing, licensing professionals, and other business managers.

Some challenges facing users of intellectual asset management systems are creating, indicating, and maintaining intellectual asset family member relationships and ensuring data consistency. As an example, for a given invention or collection of related inventions, an entity may acquire a portfolio of related patent documents filed in different jurisdictions around the world. As another example, an intellectual property law firm may be tasked to file a national filing for an invention that already has an existing family of related patent applications, where these related patent applications are being prosecuted by other law firms. In each of these examples, an entity, whether a corporation or a law firm, for example, desires to store and manage details of the invention and all of the associated related patent applications and issued patents. The process of creating, indicating, and maintaining intellectual asset family member relationships and ensuring cross-member data consistency can be difficult, time-consuming, error-prone, and inconsistent.

The subject matter claimed herein is not limited to embodiments that solve any disadvantages or that operate only in environments such as those described above. Rather, this background is only provided to illustrate one example technology area where some embodiments described herein may be practiced.

SUMMARY

Embodiments relate generally to related record creation. An example embodiment includes a method for creating a family of related intellectual asset (IA) records. The method may include obtaining IA data for a current filing. The method may include creating an IA record for the current filing. The method may include obtaining IA data for one or more related filings. The current filing and the one or more related filings belong to a family of intellectual assets. The method may also include preparing for creation of a plurality of IA records for the one or more related filings based on the IA data for the current filing and the IA data for the one or more related filings. The method may further include creating a plurality of new IA records for the one or more related filings.

This Summary is provided to introduce a selection of concepts in a simplified form that are further described below in the Detailed Description. This Summary is not intended to identify key features or essential characteristics of claimed subject matter, nor is it intended to be used as an aid in determining the scope of claimed subject matter.

Additional features and advantages of subject matter will be set forth in the description which follows or may be learned by the practice of embodiments.

BRIEF DESCRIPTION OF THE DRAWINGS

To further clarify the above and other advantages and features of the present application, a more particular description of the subject matter of this application will be rendered by reference to specific embodiments thereof which are illustrated in the appended drawings. It is appreciated that these drawings depict only example embodiments and are therefore not to be considered to limit scope of the present application. Example embodiments will be described and explained with additional specificity and detail through the use of the accompanying drawings in which.

DETAILED DESCRIPTION

Embodiments relate generally to related record creation. More particularly, embodiments relate to creation of a family of intellectual asset records. Some example embodiments are described herein with reference to the appended figures.

Figure 1A:
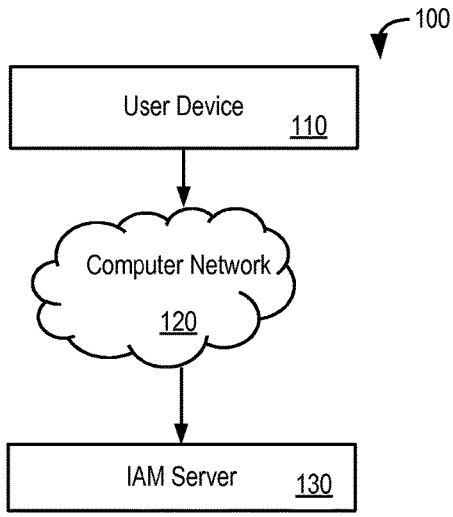
FIG. 1A illustrates an example intellectual asset management (IAM) system including an example IAM server.

FIG. 1A illustrates an example intellectual asset management (IAM) system 100. The IAM system 100 generally provides one or more IAM users (not shown) with an IAM service (not shown). The IAM system 100 may include a user device 110 communicatively coupled to an IAM server 130 via a computer network 120. The coupling between the IAM server 130 and the user device 110 may enable the IAM user to access at least some portion of an IAM service stored or otherwise available on the IAM server 130.

The IAM service may generally manage intellectual asset data and relationships between intellectual assets. For example, an intellectual property relationship service may support linking related intellectual assets, displaying an intellectual asset family tree, cascading common data to family members, automatically calculating priority and due dates based on familial relationships, error-checking intellectual asset relationships, creating intellectual asset tasks and events, etc. The IAM service may also generally schedule legal matters pertaining to intellectual assets and manage aspects of those legal matters. For example, an intellectual property docketing service may support scheduling a disclosure submission and manage the related filing dates such as provisional application filing, non-provisional conversion dates, maintenance fees, and the like. The management of intellectual assets and scheduling of these legal matters may be managed by an IAM server application (described below) which may include a set of templates, data, instructions, applications, computer programs, or some combination thereof Alternatively or additionally, the IAM system 100 may provide a visible and accessible user interface (UI) to internal and external entities through which the intellectual assets and legal matters are managed. Specifically, as described herein, the IAM service may include various IAM server applications that include one or more UI objects, for instance, to enable the IAM user to create a family of intellectual asset records.

The user device 110 in FIG. 1A may be a desktop computer, a laptop computer, a portable electronic device such as a cellular/mobile/smartphone, a tablet personal computer, a personal digital assistant, or any similar type of device. The user device 110 may include IAM client software (not shown) to access the IAM server 130. Additionally or alternatively, the user device 110 may include a web browser to access the IAM server 130 in embodiments in which the IAM server 130 provides the IAM service as a web application. The user device 110 may communicate with the IAM server 130 through other means, such as a remote desktop connection.

The user device 110 communicates with the JAM server 130 via the computer network 120. The computer network 120 relates to a collection of devices interconnected by communication channels that allow sharing of information among the interconnected devices. In this example embodiment, the computer network 120 may be or include any wired or wireless network technology such as optical fiber, electrical cables, Ethernet, radio wave, microwaves, infrared transmission, wireless internet, communication satellites, cellular telephone signals, or an equivalent networking signal that interfaces with devices to create network. Specifically, in some embodiments, the user device 110 communicates with the IAM server 130 via the internet. In other embodiments, the user device 110 may be directly coupled with the IAM server 130 and/or may be integrated directly with, and be a part of, the IAM server 130.

In FIG. 1A, one user device 110 is operably connected to communicate with the IAM server 130 via the computer network 120. However, in alternative embodiments a plurality of user devices 110, which may include various types of user devices 110, may simultaneously communicate with the IAM server 130. Additionally or alternatively, the IAM system 100 may include multiple IAM servers 130 which are operably connected to communicate information among the multiple IAM servers 130 and/or to communicate information among various user devices 110 operably connected to communicate with the IAM servers 130.

Figure 1B:
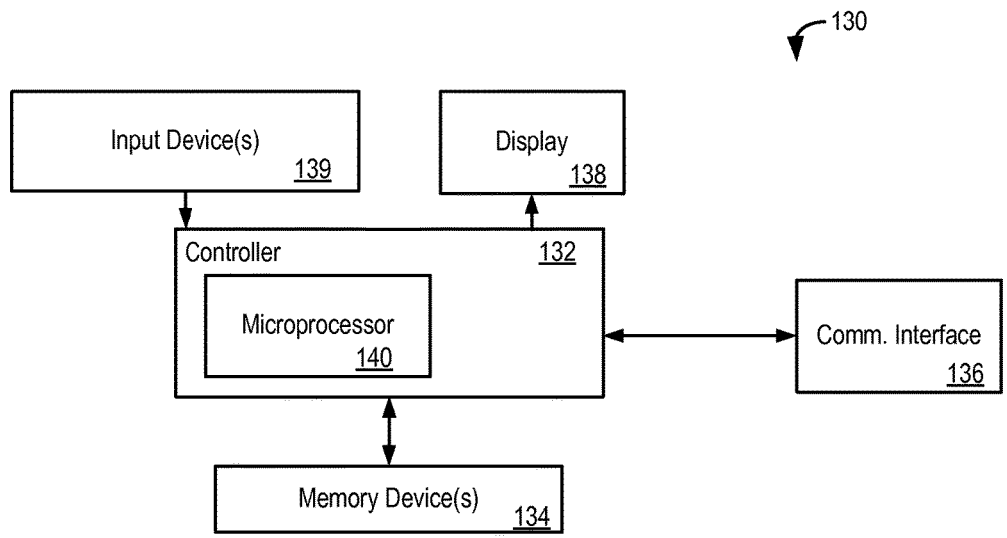
FIG. 1B illustrates an example of the IAM server of the IAM system of FIG. 1A.

FIG. 1B illustrates additional details of an example of the IAM server 130 of FIG. 1A. As depicted in FIG. 1B, the IAM server 130 may include a controller 132 and a memory device 134. The controller 132 may include a microprocessor 140 which executes an IAM server application (not shown). The IAM server application may include templates, data, instructions, applications, or computer programs stored in the memory device 134. The IAM server application may vary as necessary to implement the IAM service.

In the embodiment illustrated in FIG. 1B, the controller 132 is operatively coupled to the memory device 134, which enables the controller 132 through the microprocessor 140 to access information stored on the memory device 134 such as the IAM server applications, an intellectual asset record (IA record) and/or a file. Some details of the IA record and the file are included below. The memory device 134 may provide data to the controller 132 in various forms, such as, but not limited to, database records, files, bitstreams, and bytestreams, and the memory device 134 may comprise volatile or non-volatile memory or storage.

As depicted in FIG. 1B, the IAM server 130 can include a single controller 132, which can include the microprocessor 140 that executes an IAM server application, and a single memory device 134. However, in alternative embodiments, the IAM server 130 may include one or more controllers 132, one or more microprocessors 140 which execute a plurality of IAM server applications, and one or more memory devices 134. The one or more memory devices 134 may be remotely located from each other and/or from the controller 132.

The IAM server 130 can include a communication interface 136. The communication interface 136 enables the IAM server 130 to communicate with a user device via a computer network such as the computer network 120 of FIG. 1A. For example, with combined reference to FIGS. 1A and 1B, the communication interface 136 may enable the user device 110 to communicate to the IAM server 130 via the computer network 120. Additionally, the communication interface 136 may enable the IAM server 130 to communicate with other IAM server applications either publicly or privately available on the internet or through an interface between multiple IAM servers 130, which are operably connected via the computer network 120. Examples of the communication interface 136 include any receiver or transmitter capable of functioning with the computer network 120.

Referring back to FIG. 1B, the IAM server 130 may further include a display 138 and one or more input devices 139. The IAM user (not shown) and/or an IAM server administrator (not shown) may directly interface and control the IAM server 130 through the display 138 and the input devices 139. Examples of the display 138 may include a thin film transistor liquid crystal display, liquid crystal display, or an equivalent structure. Examples of the input devices 139 may include a QWERTY key pad, a ten key input pad, a mouse, a stylus, voice recognition software, an audio mixer, or may be integrated with the display 138 as in a touchscreen device using a surface acoustic wave, surface capacitance, projected capacitance, or an equivalent structure.

Figure 2:
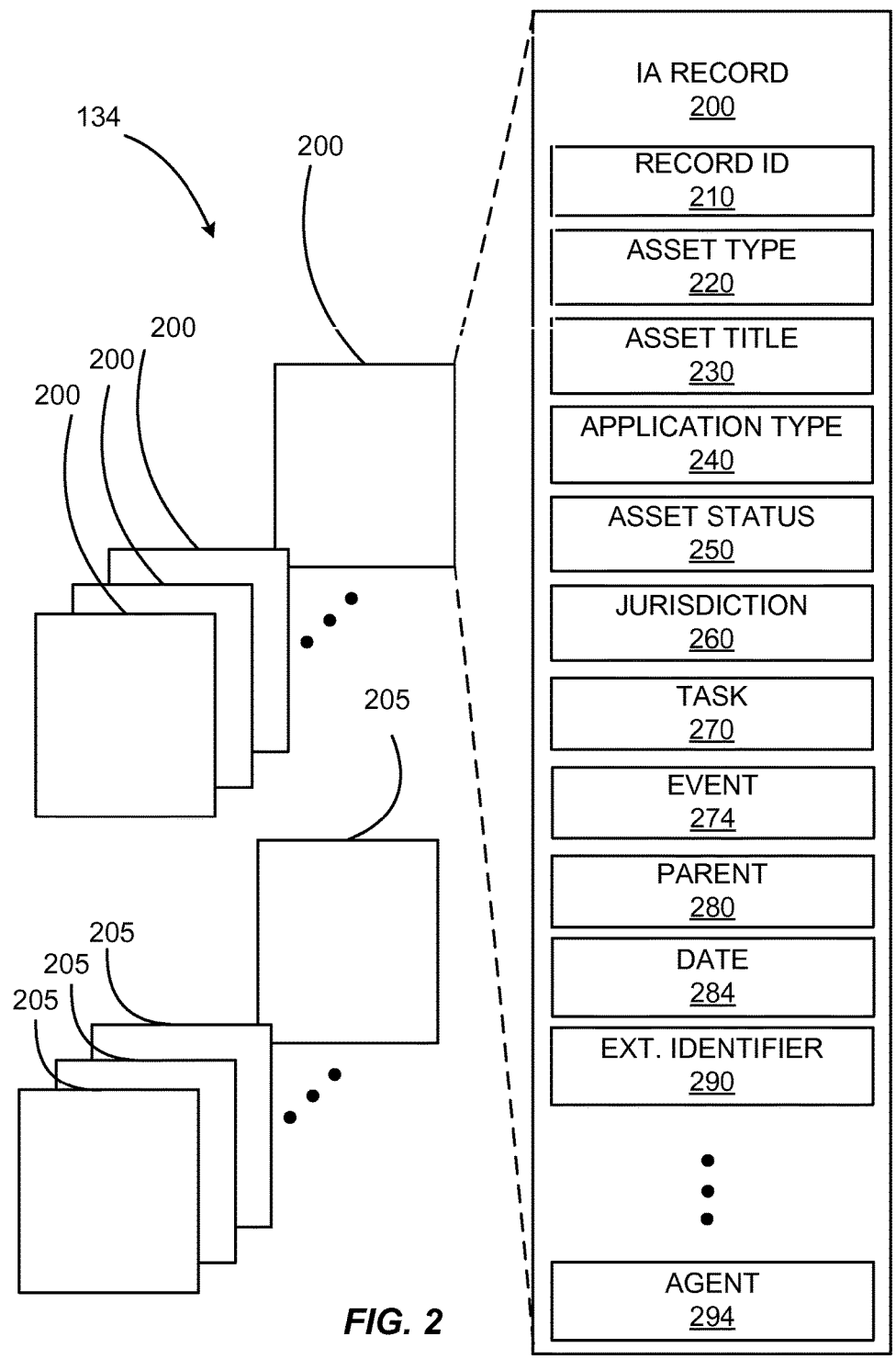
FIG. 2 illustrates example data that may be stored as part of an example intellectual asset record on the IAM server of FIG. 1B.

FIG. 2 illustrates some additional details of an example of the memory device 134 of FIG. 1B. FIG. 2 illustrates data (e.g., 200 and 205) that may be stored in the memory device 134. Specifically, in some embodiments the data may include IA records 200 and/or files 205. The files 205 may include one or more of any type of computer file readable by one or more computer programs, and examples of the files 205 include one or more of: text files; image files such as PNG, GIF, JPG, etc.; PDF files; etc.

In some embodiments, the files 205 and the IA records 200 may be stored separately. For example, the files 205 may be stored on a first memory device and the IA records 200 may be stored on a second memory device. In this and other example embodiments, the first memory device may be located in an IAM server such as the IAM server 130 of FIG. 1B and the second memory device may be located in a remote site. Alternatively, the files 205 and the IA records 200 may both be stored on a single memory device 134. Additionally or alternatively, other data may be stored in the memory device 134 including, but not limited to, IAM server applications, networking information, IAM user demographic or statistical information, IAM server administrator permissions, etc.

FIG. 2 further illustrates potential contents (e.g., 210, 220, 230, 240, 250, 260, 270, 274, 280, 284, 290, and 294) of the IA records 200. Generally, the IA records 200 include a set of related data organized into units which pertain to an intellectual asset such as a patent, a trademark, copyright, or the like. For example, the set of related data of the IA records 200 may be organized into the units including a record identifier 210, an asset type 220, an asset title 230, an application type 240, an asset status 250, a jurisdiction 260, a task 270, an event 274, a parent 280, a date 284, an external identifier 290, and an agent 294. Each of these units will be briefly discussed below.

With respect to the embodiment illustrated in FIG. 2, the record identifier 210 is an identifier uniquely identifying the IA records 200 and can be used to reference the IA records 200. The asset type 220 may be used to distinguish between various types of intellectual assets, such as patents, trademarks, copyrights, trade secrets, etc. The asset title 230 may provide a name for the IA records 200. The application type 240 may be used to denote a type of application depending on the asset type 220 of the IA records 200, for example, for patents: "Non-provisional Priority," "Non-provisional Divisional," "Designated PCT National Phase," "Reissue," etc. The asset status 250 may indicate the current status such as pending, abandoned, issued, etc. of the intellectual asset associated with the IA records 200. The jurisdiction 260 denotes a country, territory, region, or treaty for a filing of the intellectual asset associated with the IA records 200, for example, "US" for United States of America, "EP" for European Patent, "PCT" for Patent Cooperation Treaty, "EM" for European Community trademark, etc.

Generally, the task 270 denotes an action for a specified IAM user to complete by a specified time. Some examples of the task 270 may include, but are not limited to, filing a response to an office action, instructing outside counsel, attending meetings, etc. The task 270 may be a plurality of tasks 270. That is, multiple tasks 270 may be, and commonly are, associated with the IA records 200.

The event 274 denotes a change or occurrence relevant to the IA records 200, and the event 274 may include one or more details of what within the IA records 200 was modified, an indication of what the modification included, a date and time of the modification, and an indication of which IAM user, if any, instantiated the modification. The event 274 may be a plurality of events 274. That is, multiple events 274 may be, and commonly are, associated with the IA records 200.

The parent 280, if any, denotes a parent IA record for the IA records 200, and may be represented by the record identifier 210. The date 284 denotes a date for a milestone in a lifetime of the intellectual asset associated with the IA records 200, such as a priority date, a filing date, a publication date, an issuance date, etc., and the date 284 is commonly associated with the external identifier 290. The external identifier 290 is an identifier uniquely identifying a filing, a published document, or the like for the intellectual asset represented by the IA records 200, and the external identifier 290 may be in whatever format is used for the given jurisdiction 260. The date 284 and the external identifier 290 may be a plurality of dates 284 and external identifiers 290, respectively. That is, multiple dates 284 and the external identifiers 290 may be, and commonly are, associated with the IA records 200 for various milestones in the lifetime of the IA records 200.

The agent 294 denotes a law firm or agent that is responsible for the intellectual asset for the jurisdiction 260 of the IA records 200, and the responsibility includes, for example: prosecution of the intellectual asset with a patent or trademark office of the corresponding territory, region, country, or treaty; payment of maintenance and/or annuity fees; etc.

Some embodiments described herein relate to IA record (e.g., the IA records 200) creation for related intellectual asset family members. Some details of the creation of the IA records are described below. Some embodiments also provide for determination of relationships and assignment of the parent 280, creation of one or more tasks 270 for each created IA record 200, recording of one or more events 274 associated with IA record creation, determination and indication of one or more dates 284, and association of one or more agents 294 for each created IA record 200.

As stated above with reference to FIG. 1A, the IAM system 100 enables the user device 110 to access the IAM server 130 to obtain the IAM service. Some example solutions for accessing the IAM server 130 include IAM client software and/or a web browser loaded on the user device 110. Alternatively, the user device 110 may communicate with the IAM server 130 through a remote desktop connection. In embodiments with the web browser, the IAM server 130 provides the IAM service as a web application.

To provide the IAM service, examples of the IAM system 100 may allow the IAM user to interface with the IAM server 130. The interface between the IAM user and the IAM server 130 may utilize UI objects. The UI objects may allow the IAM user to create multiple IA records 200 for related intellectual asset family members. Additionally or alternatively, the set of UI objects may provide the IAM user information contained in the IA record 200 units.

Depending on the configuration of the IAM system 100, the UI objects may be created and provided to the IAM user differently. The UI objects may be defined, controlled, displayed, or some combination thereof, by the IAM server 130. The controller 132 of the IAM server 130 may display UI objects through the user device 110 for interaction with the IAM user. In some embodiments, the controller 132 may also utilize client-side scripting at the user device 110 to make user interaction more responsive. In some embodiments, the UI objects may be a subcomponent of a parent interface or a superset UI object (not shown), such as an encompassing parent window. The UI objects may be created by the IAM server 130 and may be provided to the web browser loaded on the user device 110. In this embodiment, the web browser renders the UI objects which may be described in HTML, JavaScript, CSS, or an equivalent language. In alternative embodiments, the UI objects may be implemented as a dedicated client on the user device 110 or the UI objects may be implemented through the IAM user interfacing directly with the IAM server 130. Each field contained within UI objects described below may be of any type to facilitate data entry by the IAM user, and may include a textbox, checkbox, dropdown, radio buttons, pick list, and equivalents. Represented field types in figures herein are examples only, and may be replaced by any other field type for IAM user interaction. Additionally, some fields contained within UI objects may prompt the IAM user for data selection or entry that is used in most embodiments, while other fields may include optional IAM user interaction.

With combined reference to FIGS. 1A-2, in some embodiments, the IA server 130 or a module included therein may perform operations configured to create a family of related intellectual asset records. For example, the IAM server 130 or a module included therein may obtain IA data for a current filing and for a family of related filings. The IAM server 130 or the module may create an IA record for the current filing based on the IA data for the current filing. The IAM server 130 or the module may then determine there are one or more errors present. In response to detection of an error, the IAM server 130 or the module may provide error details to the IAM user and provide an opportunity for the IAM user to correct the errors. In response to detecting no errors, the IAM server 130 or the module may confirm default data for one or more law firms or agents associated with the intellectual asset and/or the family member. The IAM server 130 or the module may then prepare to create the IA record. The IAM server 130 or the module may then present details for IA record creation to the IAM user. The IAM server 130 or the module may determine whether the IA family creation has been cancelled. In response to the IA family creation process being cancelled, the IAM server 130 or the module may delete cached data. In response to the IA family creation process not being cancelled, the IAM server 130 or the module may create new IA records 200 for the related filings.

Additionally or alternatively, the IAM server 130 or the module may determine IA relationships between a current filing and related filings. The IAM server 130 or the module may determine an assignment of IA record links between the current filing and the related filings may be determined. The IA record links may include an indication of a relationship between the current filing and one or more of the related filings. The IAM server 130 or the module may create tasks and events for IA records for the related filings. The tasks may include prosecution tasks. The IAM server 130 or the module may cascade common data to the IA records 200 of the related filings. The IAM server 130 or the module may associate law firms with the IA records 200 for the related filings. The IAM server 130 or the module may calculate priority dates and due dates may be based at least partially on the determined IA relationships. The IAM server 130 or the module may create new IA records for the related filings. The new IA records may be at least partially based on tasks, the events, the common data, the priority dates, the due dates, the law firms, or any combination thereof.

Figure 3:
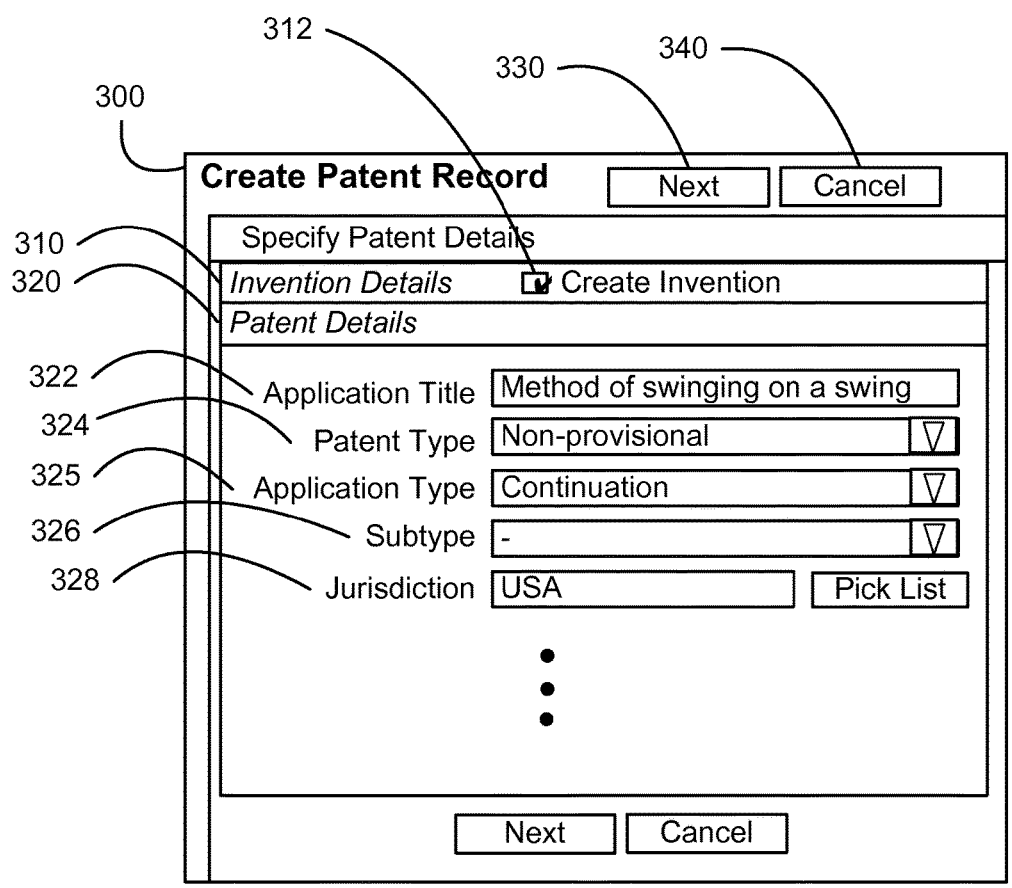
FIG. 3 is a block diagram illustrating an example user interface (UI) object that may be included in the IAM system of FIG. 1A.

Turning next to FIG. 3, details of an example patent record creation UI object 300 are disclosed. In some embodiments the IAM user may interact with the patent record creation UI object 300 to specify details of a patent application. Hereinafter, the term "patent" is used to interchangeably indicate one of an issued patent or pending patent application. In the example provided in FIG. 3, the IA records 200 to be created is a patent asset type 220, although comparable UI objects may be used for creation of other types of IA records, such as for trademark records.

While the IAM user may interact with the patent record creation UI object 300 to specify details of an associated invention for the patent application in an invention details panel 310, data for the patent application can instead be used by the controller 132 of the IAM server 130 to create a new invention record and default record units using values provided by the IAM user for the patent application. The IAM user may indicate a request to create the associated invention record automatically by selection of a create invention field 312.

The IAM user interacts with a patent details panel 320 to provide values for various important details. For example, the IAM user may interact with an application title field 322 to enter title text for the patent application, which the controller 132 may use to store data into the asset title 230. Similarly, the IAM user may interact with other objects within the patent details panel 320 to provide data that the controller 132 may use to store data within data units of one or more newly-created IA records 200. For example, a value provided in a patent type field 324 along with a value provided by the IAM user for an application type field 325 may together be used to store data in the application type 240. Additionally or alternatively, values provided for each of the patent type field 324 and the application type field 325 may be stored separately within the corresponding IA records 200. The IAM user may provide a value for a subtype field 326 and another value for a jurisdiction field 328, and the value provided for the jurisdiction field 328 may be used by the controller 132 to store a value in the jurisdiction 260 of the corresponding IA records 200. The IAM user may interrupt data entry and interaction with the patent record creation UI object 300 at any time by selecting a cancel button 340, and in response the controller 132 may delete any cached data without IA record creation and also may present another UI object in place of the patent record creation UI object 300. Once the IAM user has entered all desired data, the IAM user may indicate a desire to progress to a next step by selection of a next button 330.

Figure 4:
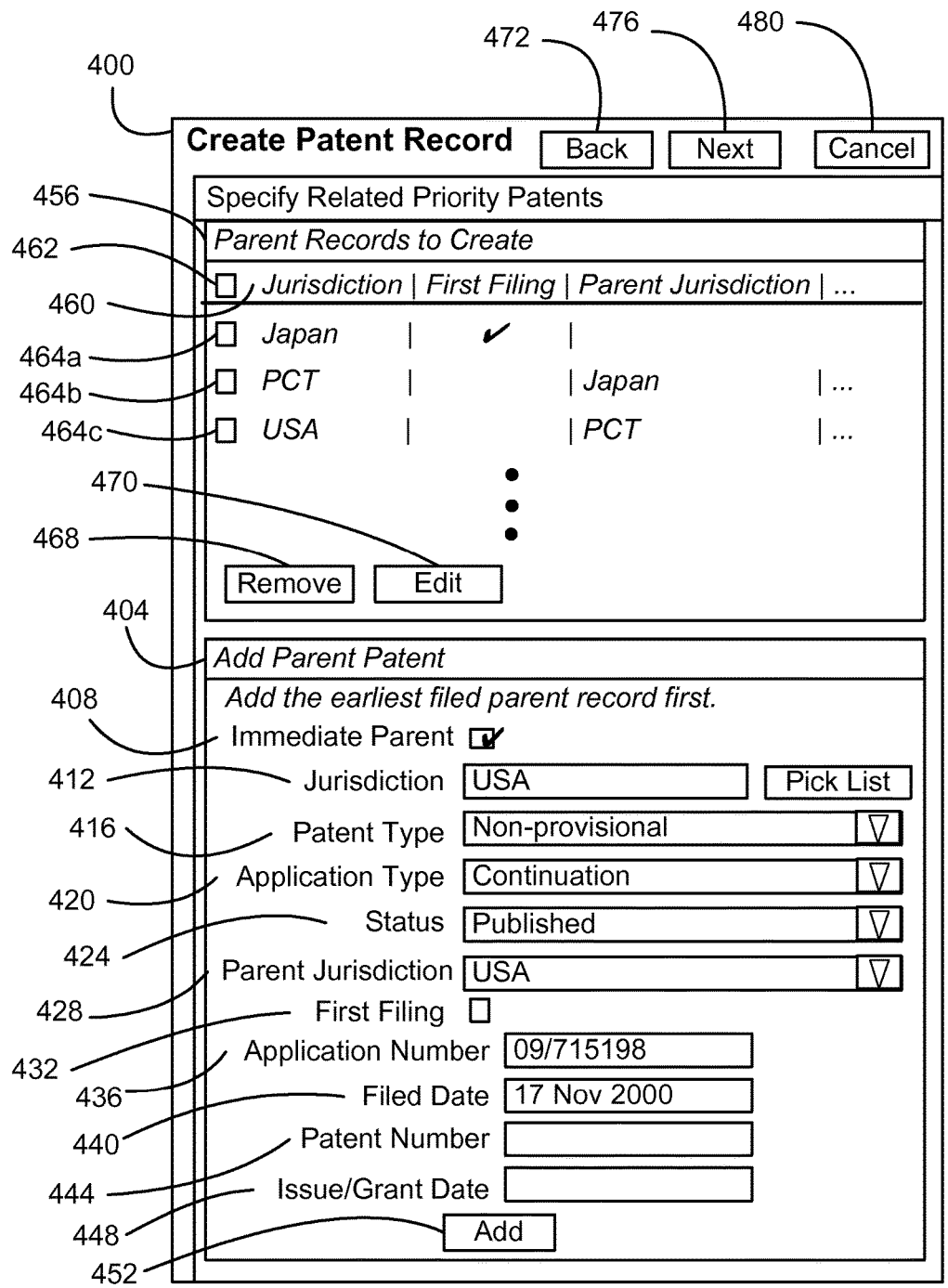
FIG. 4 is a block diagram depicting another example UI object that that may be included in the IAM system of FIG. 1A.

Turning now to FIG. 4, details of an example patent priority UI object 400 are disclosed. The IAM user may interact with the patent priority UI object 400 as the next step after providing patent application details in the patent record creation UI object 300. Alternatively, the patent record creation UI object 300 may be combined with the patent priority UI object 400 to provide a single step to the IAM user for patent family data entry.

In the example provided in FIG. 4, the IAM user may interact with the patent priority UI object 400 to provide details on patent family members and relationships therebetween. The controller 132 of the IAM server 130 may use the provided data from the IAM user in creation of IA records 200 for the patent family. In the example provided in FIG. 4, the IA records 200 to be created are of the patent asset type 220, although comparable UI objects may be used for creation of other types of IA records, such as for trademark record families.

The IAM user may interact with a parent patent panel 404 to provide details on a related parent patent. If the parent patent is an immediate parent of the patent application specified in the patent record creation UI object 300, then the IAM user may indicate this through selection of an immediate parent field 408. The IAM user may also provide details for other fields within the parent patent panel 404, and the controller 132 may use the provided details for assignment of values to associated data units within a newly-created patent record for the parent patent. Other example fields include a jurisdiction field 412, a patent type field 416, and an application type field 420. The controller 132 may use a value entered by the IAM user into a status field 424 for storage of a value in the asset status 250 of the new IA records 200. If one or more parent patents have already been specified by the IAM user, then a parent jurisdiction field 428 may be selected by the IAM user to specify which jurisdiction of specified parent patents is the parent for the parent patent currently being specified by the IAM user. The specification of parent jurisdiction may be utilized by the controller 132 in establishing family member relationships, and may be used to store a value in the parent 280 of a new patent record. Additionally or alternatively, an explicit identifier of a parent patent (not illustrated) may be specified by the IAM user for the controller 132 to use in establishing family relationships.

The IAM user may interact with date and identifier fields within the parent patent panel 404 to provide relevant dates and identifiers for the corresponding parent patent, such as an application number field 436, a filed date field 440, a patent number field 444, whether a filing is a first filing via the first filing box 432, and an issue/grant date field 448. Not all of the date and identifier fields may be applicable for the parent patent. Provided values may be used by the controller 132 for storage of values in one or more corresponding dates 284 and the external identifiers 290 within a newly-created patent record. When the IAM user has provided all desired parent patent data, the IAM user may select an add button 452 to temporarily store entered data, which may then be presented by the controller 132 in a parents table 456.

A parent patent details header 460 within the parents table 456 may display a list of various fields for parent patents, and below the parent patent details header 460 may be listed associated values for each field for each parent patent. Data for each added parent patent may be edited or removed, and a select-all checkbox 462 allows for selection of all parent patents, while a single-select checkbox 464 (464a, 464b, and 464c) allows for selection of a respective parent patent. With one or more parent patents selected using the select-all checkbox 462 or one or more single-select checkbox 464, the IAM user may remove selected parent patents through selection of a remove button 468, and the IAM user may edit selected parent patents through selection of an edit button 470.

At any time, the IAM user may select a back button 472 to go back to the patent record creation UI object 300 to edit details earlier provided there. Once all desired data has been entered, the IAM may select a next button 476 to progress to a next step. The IAM user may interrupt data entry and interaction with the patent priority UI object 400 at any time by selecting a cancel button 480, and in response the controller 132 may delete any cached data without IA record creation and also may present another UI object in place of the patent priority UI object 400.

Figure 5:
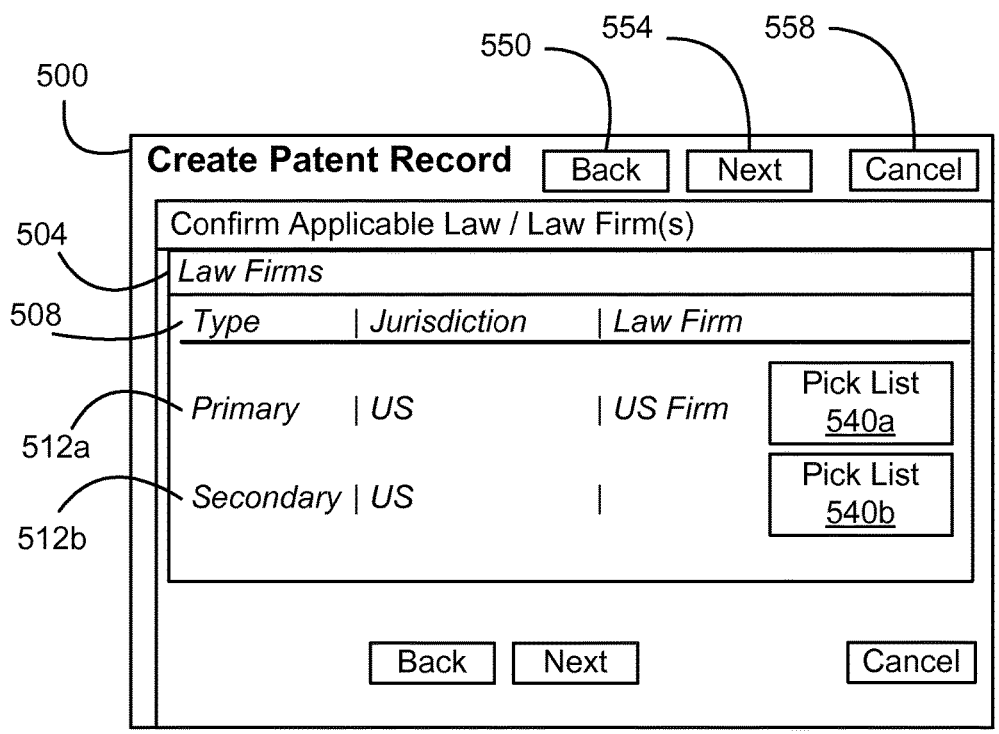
FIG. 5 illustrates another example UI object that may be included in the IAM system of FIG. 1A.

Turning now to FIG. 5, details of an example law firm selection UI object 500 are disclosed. The IAM user may interact with the law firm selection UI object 500 as the next step after providing parent patent details in the patent priority UI object 400. Alternatively, the patent priority UI object 400 and/or the patent record creation UI object 300 may be combined with the law firm selection UI object 500 to provide a single step to the IAM user for patent family data entry. In the example provided in FIG. 5, the IAM user may interact with the law firm selection UI object 500 to provide details on a law firm or agent, or multiple law firms or agents, for one or more patent records within the new patent family. The controller 132 of the IAM server 130 may assign a predetermined law firm or agent for each patent record based upon a default value per jurisdiction. In the example provided in FIG. 5, the IA records 200 to be created are of the patent asset type 220, although comparable UI objects may be used for creation of other types of IA records, such as for trademark record families.

The controller 132 may present a law firms panel 504 with which the IAM user may interact to select one or more law firms or agents that will be responsible for one or more aspects of a patent associated with each patent record. A law firm details header 508 within the law firms panel 504 may display a list of various fields for law firms, and below the law firm details header 508 may be listed associated values for each law firm to be assigned to an associated patent record. In the example provided in FIG. 5, the IAM user may interact with a primary law firm field 512a and a secondary law firm field 512b to indicate one or more law firms to assign for the patent record application specified by the IAM user in the patent record creation UI object 300, in this case for the United States. In the example provided in FIG. 5, a default law firm value, for example a firm named "US Firm" or the like, may be automatically assigned by the controller 132 for a jurisdiction of the United States. If the IAM user desires to modify the law firm to be assigned, then the IAM user may select a law firm choice object 540 (540a for primary law firm or 540b for secondary law firm) to provide a different law firm. Based on selections within the primary law firm field 512a and the secondary law firm field 512b, the controller 132 may assign associated values within the agent 294 unit within the IA records 200 to be created. In the example provided in FIG. 5, the primary law firm field 512a and the secondary law firm field 512b are both illustrated, though inclusion of both fields is optional, and only one law firm field may be provided instead. Additionally or alternatively, while law firm selection for only one patent is illustrated in FIG. 5, law firm selections for other patents may also be provided within the law firm selection UI object 500.

At any time, the IAM user may select a back button 550 to go back to the patent priority UI object 400 to edit details earlier provided there. Once all desired data has been entered, the IAM may select a next button 554 to progress to a next step. The IAM user may interrupt data entry and interaction with the law firm selection UI object 500 at any time by selecting a cancel button 558, and in response the controller 132 may delete any cached data without IA record creation and also may present another UI object in place of the law firm selection UI object 500.

Figure 6:
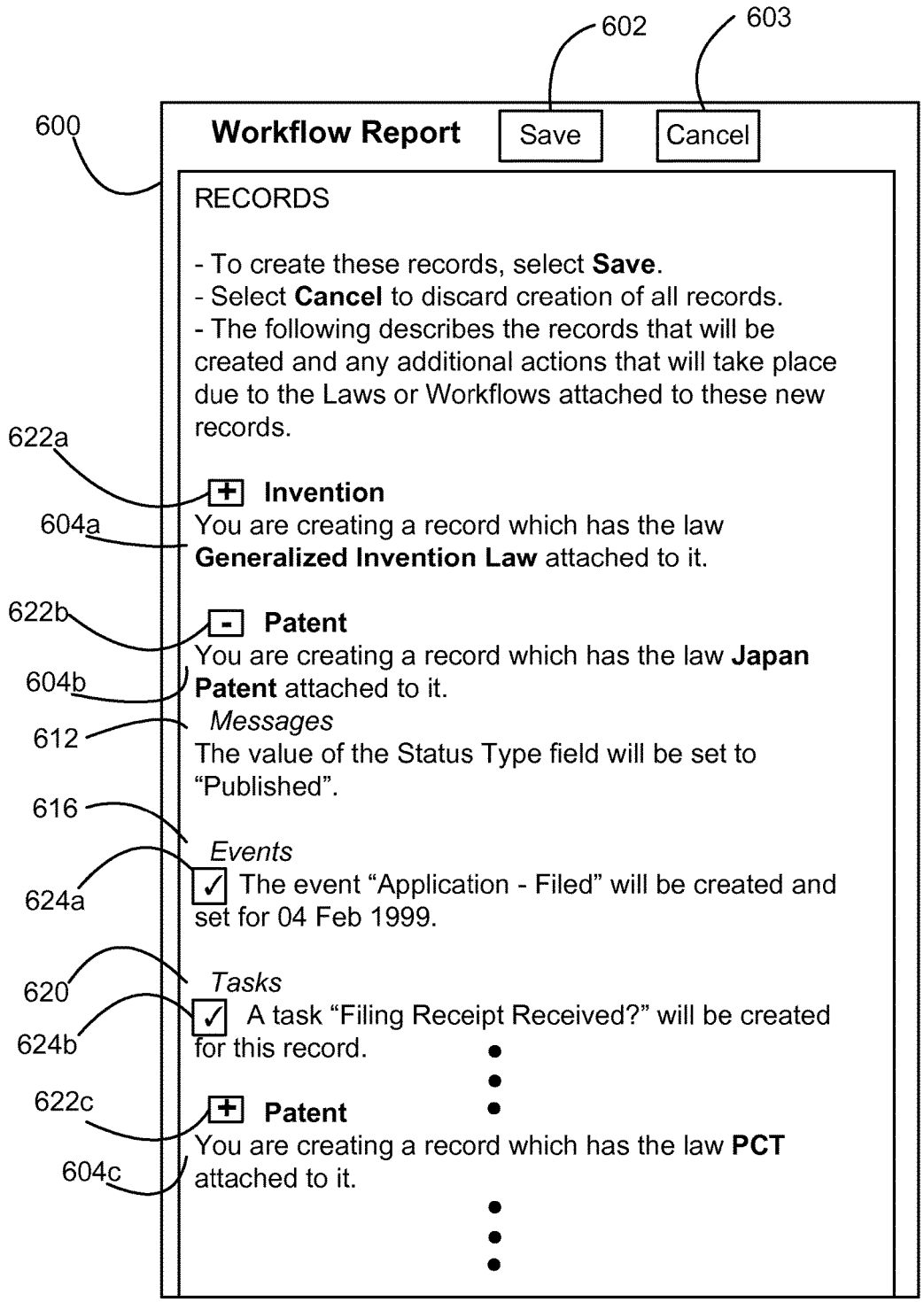
FIG. 6 illustrates another example UI object that may be included in the IAM system of FIG. 1A.

FIG. 6 illustrates an example workflow report UI object 600. The workflow report UI object 600 provides some details on the IA records 200 to be created as a result of IAM user data entry for the patent family. Data provided through IAM user interaction with the patent record creation UI object 300, the patent priority UI object 400, and/or the law firm selection UI object 500 may trigger the controller 132 to analyze preconfigured workflow and country rules to determine and display, within the workflow report UI object 600, a list of one or more actions to be triggered by the IAM user input. The IAM user can confirm the listed actions by selecting a save object 602. Alternatively, the IAM user can prevent the listed actions from occurring by selecting a cancel object 603.

The listed actions within the workflow report UI object 600 detail the IA records 200 to be created by the controller 132 upon confirmation, wherein the confirmation includes IAM user selection of the save object 602. Some examples of the listed actions may include record information 604 (604a, 604b, and 604c), messages 612, events 616, tasks 620, or some combination thereof. The record information 604 may include informative details on a type of IA record to be created along with a law or workflow associated with the IA record to be created. The messages 612 may include informative details on various data settings to be made for the IA records 200, such as field values, and the data settings to be made may be based upon the associated law or workflow for the corresponding IA record. The events 616 may include a list of the events 274 to be recorded in the IA records 200, and the events 274 to be recorded may be based upon the associated law or workflow for the corresponding IA record. The tasks 620 may include a list of tasks 270 to be created for the IA records 200, and the tasks 270 to be created may be based upon the associated law or workflow for the corresponding IA record.

The workflow report UI object 600 may include a show/hide details object 622 for each IA record 200 to be created, and selection of the show/hide details object 622 shows or hides details for a respective IA record 200 such as the messages 612, the events 616, and/or the tasks 620. For example, the show/hide details object 622 may include an indication that the corresponding IA records 200 details are currently hidden and that selection of the show/hide details object 622 may therefore result in display of the IA records 200 details, and the indication may be presented as a "+." Correspondingly, the show/hide details object 622 may include an indication that the corresponding IA records 200 details are currently shown and that selection of the show/hide details object 622 may therefore result in hiding the IA records 200 details, and the indication may be presented as a "-." In some embodiments, the show/hide details object 622 and the corresponding IA record details default to having the IA record details being hidden, such as represented by 622a and 622c. To show IA record details when hidden, the IAM user may select the show/hide details object 622, and as illustrated in FIG. 6, the second IA record details are shown because the show/hide details object 622b for the corresponding IA record has been selected. Additionally or alternatively, one or more show/hide details objects 622 may be defaulted to show IA record details.

Additionally, the workflow report UI object 600 may include an action checkbox 624 for each event 616 and each task 620. In some embodiments, by default the action checkbox 624 is checked, which may indicate that the corresponding action may occur upon confirmation of the workflow report UI object 600. In these and other embodiments, by unchecking the action checkbox 624, the IAM user may indicate that the corresponding action may not occur upon confirmation of the workflow report UI object 600. For example, if the IAM user unchecks the action checkbox 624a, the corresponding action, in this case an indication that an event "Application—Filed" will be created and set for 4 Feb. 2009, may not be recorded within the corresponding IA records 200. If, however, the IAM user leaves the action checkbox 624b checked, then the corresponding action, the task 270 to confirm that a filing receipt has been received, may be opened and stored within the corresponding IA records 200 upon IAM user confirmation of the list of actions within the workflow report UI object 600. Upon IAM user selection of the save object 602, the controller 132 creates the listed IA records 200 using data provided earlier by the IAM user, automatic default values, calculated dates, and checked actions on the workflow report UI object 600.

Figure 7:
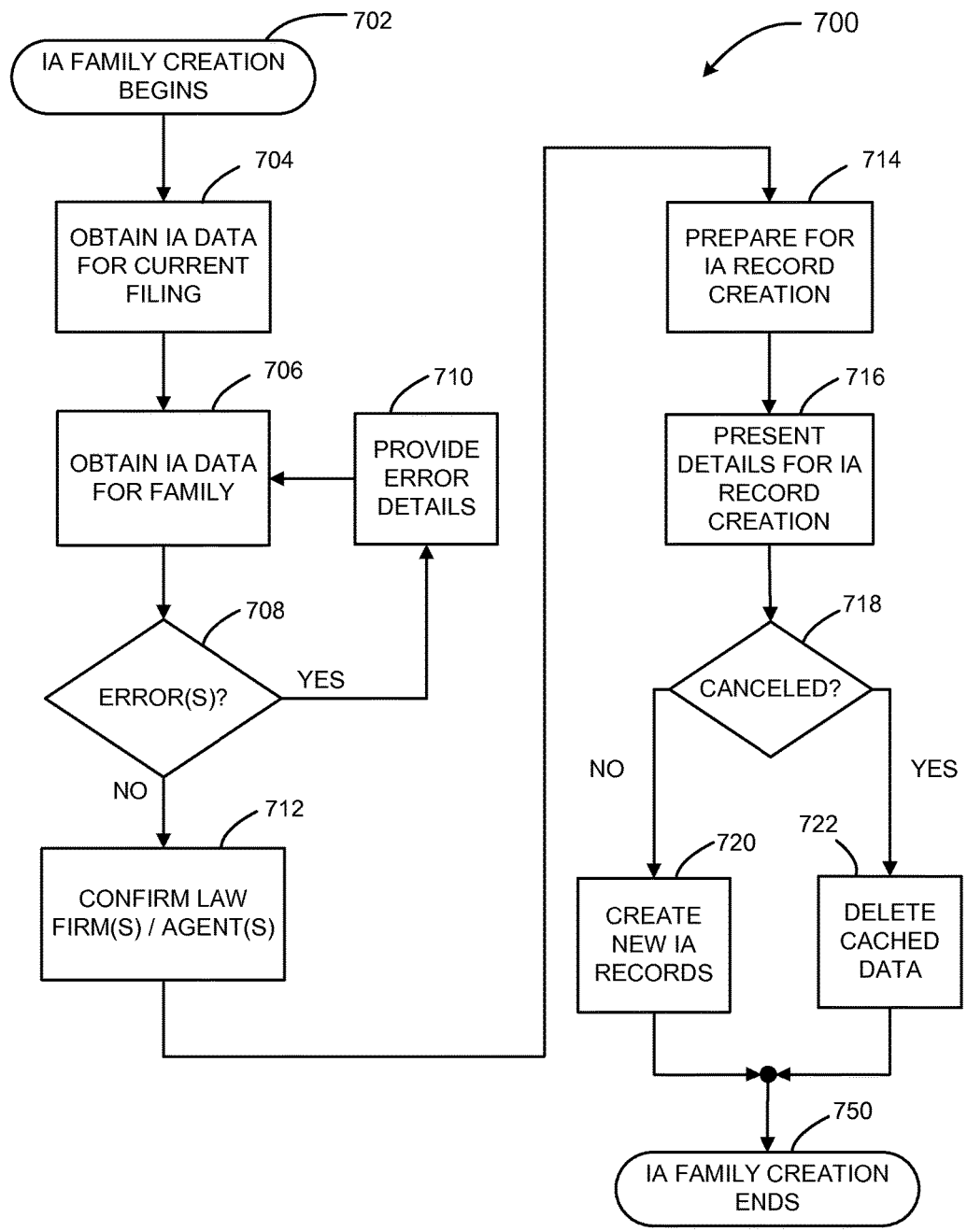
FIG. 7 illustrates an example method for creation of a family of related intellectual asset records.

FIG. 7 is a flow diagram of an example method 700 for creating a family of related intellectual asset records. With reference to FIGS. 2-7, additional details of the method 700 for creation of a family of the IA records 200 are disclosed.

The method 700 may be performed by an electronic or computing device, such as the IAM server 130. For example, the method 700 may be programmably performed in some embodiments by the IAM server 130. The IAM server 130 or another electronic or computing device may include or may be communicatively coupled to a non-transitory computer-readable medium (e.g., the memory devices 134 of FIG. 1B) having stored thereon or encoded therein programming code or instructions that are executable by a processor to perform or cause performance of the method 700. Additionally or alternatively, the IAM server 130 or another electronic or computing device may include a processor (e.g., the microprocessor 140 of FIG. 1B) that is configured to execute computer instructions to cause or control performance of the method 700. Although illustrated as discrete blocks, various blocks may be divided into additional blocks, combined into fewer blocks, or eliminated, depending on the desired implementation.

At block 702, the method 700 may begin. For example, the IA record family creation process may begin through a request received from the IA user. At block 704, IA data for a current filing may be obtained. For example, the controller 132 of the IAM server 130 obtains data for an intellectual asset to be stored in a new IA record 200 in the memory device 134. The IAM user may interact with a UI object such as the example patent record creation UI object 300 of FIG. 3 in order to specify intellectual asset data.

At block 706, IA data may be obtained for a family. Specifically, in some embodiments, the IA data may be obtained for one or more related filings that may belong to the family of intellectual assets of the current filing. For example, the controller 132 obtains data for familial intellectual assets related to the intellectual asset from 704, and the IAM user may interact with a UI object such as the example patent priority UI object 400 of FIG. 4 in order to specify intellectual asset data for family members.

At block 708, it may be determined whether there are one or more errors present. In some embodiments, at any point during or after data entry by the IAM user, the controller 132 may check for errors. In response to detection of an error ("Yes" at 708), the method 700 may proceed to block 710. At block 710, error details may be provided. For example, upon error detection, the controller 132 may present error details to the IAM user. Additionally, an opportunity for the IAM user to correct the one or more errors may be offered in data provided at blocks 704 and/or 706.

In response to detecting no errors ("No" at block 708), the method 700 may proceed to block 712. At block 712, default data for one or more law firms or agents associated with the intellectual asset and/or the family member may be confirmed. For example, after the controller 132 detects no errors in entered intellectual asset data, the controller 132 may present default data for one or more law firms or agents associated with the intellectual asset from data obtained at block 704 and/or the family member intellectual assets obtained at block 706. The IAM user may interact with a UI object such as the example law firm selection UI object 500 of FIG. 5 in order to confirm or modify law firm or agent details.

At block 714, IA record may be prepared to be created. For example, after the controller 132 has collected data used in an IA record, the controller 132 determines what the IA records 200 may be created and what information may be stored therein. In some embodiments, the preparation of the IA record creation may include displaying a workflow report for the one or more related filings. The workflow report may include one or more actions related to prosecution of the one or more related filings that are based upon a preconfigured law or workflow. Additionally, preparation of the IA record creation may include receiving an IAM user input designating a subset of the actions to occur upon confirmation by the IAM user. The actions include one or more of record information, a message, events, tasks, or any combination thereof. The record information may include informative details on a type of IA record and the preconfigured law or workflow associated with the IA record. The message may include informative details of field values for the IA record based upon the associated law or workflow. The events may include events to be recorded in the IA record based upon the associated law or workflow. The tasks may include tasks to be created for the IA record based upon the associated law or workflow.

In some embodiments, the IA data of the one or more related filings may include a jurisdiction, a first filing, and an application type, for example. The associated law or workflow may be determined based at least partially on one or more of the jurisdiction, the first filing, and the application type.

At block 716, details for IA record creation may be presented. For example, the controller 132 presents details for the IA records 200 to be created for the intellectual asset family, and may provide a UI object such as the example workflow report UI object 600 of FIG. 6 to present the details. Additionally, the IAM user may interact with the UI object provided in order to confirm actions to be taken.

At block 718, it may be determined whether the IA family creation has been cancelled. In some embodiments, at any point (e.g., following any of 702, 704, 706, 708, 710, 712, 714, 720, and 722) during the family creation process, the IAM user may request to cancel the process. In response to the IA family creation process being cancelled ("Yes" at 718), the method 700 may proceed to block 722. At block 722, the cached data may be deleted. For example, the controller 132 may delete any cached data without creation of new IA records. In response to the IA family creation process not being cancelled ("No" at 718), the method 700 may proceed to block 720. At block 720, one or more new IA records may be created. For example, if the IA record family creation process 702 is not canceled, and the IAM user confirms the details for new IA record creation, then the controller 132 creates associated new IA records 200. The method 700 may end at block 750.

For this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

As an example of the method 700, the IAM user may wish to create a collection of related patent records in the IAM system for a patent family. A corporate IAM user may add a newly-acquired existing patent family into the IAM system, or a law firm IAM user may add a patent family into the IAM system due to a law firm client request to file and prosecute a patent application in a given jurisdiction for an existing patent family. Other patent family members may already be issued patents and/or handled by an external law firm or agent. The IAM user may leverage the method 700 for creation of the new collection of related patent records in the IAM system. In this example, a following set of steps may occur.

At block 702, the method 700 begins through a request from the IAM user. At block 704 the controller 132 of the IAM server 130 obtains data for a patent to be stored in a new IA record 200 in the memory device 134. The IAM user may interact with the patent record creation UI object 300 of FIG. 3 in order to specify patent data such as for a non-provisional continuation patent application to be filed in the United States for a method for swinging on a swing as indicated in the application title field 322, the patent type field 324, the application type field 325, and the jurisdiction field 328 of FIG. 3. With reference to FIG. 3, the IAM user indicates a desire to automatically have a new invention record automatically created by selection of the create invention field 312, and the IAM user selects the next button 330 to proceed to patent family member data entry.

At block 706, the controller 132 obtains data for patent family members related to the patent application from block 704, and the IAM user may interact with the patent priority UI object 400 of FIG. 4 in order to specify data for patent family members. In the example provided in FIG. 4, the IAM user has already entered data associated with a Japanese first filing, a PCT patent application filing claiming priority to the Japanese filing, and a US national phase filing from the PCT patent application, and all the data therefor is presented to the IAM user in the parents table 456 under the parent patent details header 460.

In the example provided in FIG. 4, the IAM user has also entered data associated with an immediate parent patent for the patent application of block 704, and the immediate parent in this example is a published non-provisional continuation US application with an application Ser. No.09/715,198 and a filed date of 17 Nov. 2000. The parent patent for the immediate parent patent is the US national phase filing presented in the parents table 456. Upon IAM user selection of the add button 452 of FIG. 4, the controller 132 adds the data of the immediate parent patent to the parents table 456. The controller 132 checks for errors at block 708 and presents details therefor at block 710. Examples of patent data entry errors may include, but are not limited to: adding a designated PCT national phase patent without having a PCT patent application parent; not specifying a first filing; not specifying an immediate parent for the patent application from block 704; and the like.

Upon the IAM user selection of the next button 476 of FIG. 4, and once the controller 132 detects no errors in entered patent data, at block 712 the controller 132 may present default data for one or more law firms or agents associated with the patent from block 704 and/or the family member patents from block 706, and the IAM user may interact with the law firm selection UI object 500 of FIG. 5 in order to confirm or modify law firm or agent details. In the example provided in FIG. 5, the primary law firm field 512a is defaulted to present a law firm called "US firm" for the United States jurisdiction. The IAM user may replace the value through selection of the pick list 540a, or may indicate approval of the default value through selection of the next button 554 of FIG. 5. When the controller 132 has collected all involved data, the controller 132 determines what patent records may be created and what information may be stored therein at block 714.

The controller 132 presents details for the IA records 200 to be created for the patent family at block 716, and may provide the workflow report UI object 600 of FIG. 6 to present the details. The IAM user may interact with the workflow report UI object 600 in order to confirm actions to be taken. For example, creating the event "Application—Filed" for a new Japanese patent record. If the IAM user confirms details for new invention and patent record creation through selection of the save object 602 of FIG. 6, the controller 132 creates associated new invention and patent records at block 720. The controller 132 may use the data provided at block 704 to default various data units for all records, including the new invention record and all family patent records, for data units such as the asset title 230 (of FIG. 2). The controller 132 may additionally or alternatively calculate priority dates associated with various patent family members based on specified family member relationships.

The method 700 may be utilized for creation of families for any type of intellectual asset records, not just patent records. For example, the method 700 may be used to create a family of related trademark application records with an overarching mark record applicable to all trademark application records in the associated family. It may also be appreciated that the method 700 may simplify creation of intellectual asset families and associated relationships and reduces data entry work for the IAM user through default settings, automatic priority date calculation, and reuse of data for multiple records, thereby also improving data integrity.

Figure 8:
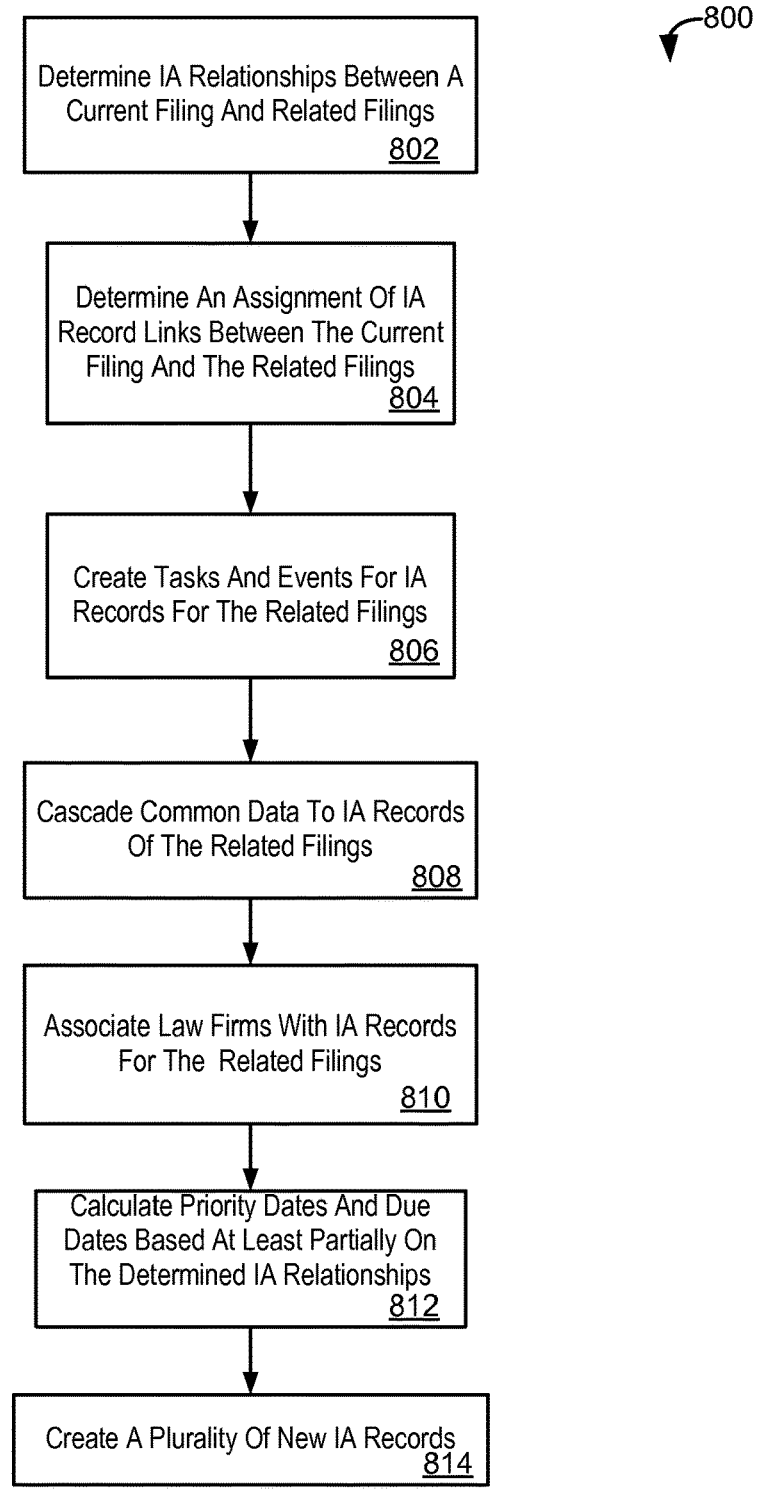
FIG. 8 illustrates another example method for creation of a family of related intellectual asset records.

FIG. 8 is a flow diagram of an example method 800 for creating a family of related intellectual asset records. The method 800 may be performed by an electronic or computing device, such as the IAM server 130. For example, the method 800 may be programmably performed in some embodiments by the IAM server 130. The IAM server 130 or another electronic or computing device may include or may be communicatively coupled to a non-transitory computer-readable medium (e.g., the memory devices 134 of FIG. 1B) having stored thereon or encoded therein programming code or instructions that are executable by a processor to perform or cause performance of the method 800. Additionally or alternatively, the IAM server 130 or another electronic or computing device may include a processor (e.g., the microprocessor 140 of FIG. 1B) that is configured to execute computer instructions to cause or control performance of the method 800. Although illustrated as discrete blocks, various blocks may be divided into additional blocks, combined into fewer blocks, or eliminated, depending on the desired implementation.

At block 802, IA relationships between a current filing and related filings may be determined. For example, the IA relationships may include, but are not limited to, a parent/child relationship, a foreign/domestic relationship, a continuation/parent relationship, a continuation-in-part/parent relationship, a nationalization relationship, a PCT/nationalization relationship, a PCT/priority relationship, and a provisional/non-provisional relationship.

At block 804, an assignment of IA record links between the current filing and the related filings may be determined. The IA record links may include an indication of a relationship between the current filing and one or more of the related filings. For instance, the current filing may be the parent of a first related filing and a child of a second related filing.

At block 806, tasks and events may be created for IA records for the one or more related filings. The tasks may include prosecution tasks. For instance, the tasks may include, but are not limited to, filing an application, filing a response, and paying a fee. The events may include a change or occurrence relevant to the IA record. For instance, the events may include one or more details of what within the IA record was modified, an indication of what the modification included, a date and time of the modification, and an indication of which IAM user instantiated the modification.

At block 808, common data may be cascaded to IA records of the related filings. For example, assignee information and/or inventor information may be common data shared by the current filing and the related filings. Accordingly, the assignee information may be cascaded to the IA records.

At block 810, law firms may be associated with the IA records for the related filings. For example, a first law firm may be associated with each of the IA records. In some embodiments, the first law firm and a second law firm may be associated with the IA records as a default law firm.

At block 812, priority dates and due dates may be calculated based at least partially on the determined IA relationships. For example, the current filing may be provisional patent application and a first related application may include a PCT application claiming priority to the current filing. Accordingly, the filing date of the first related application can be calculated as one year from the filing date of the provisional, and the priority date of the first related application may be calculated as the provisional application filing date. associating one or more law firms with IA records for the one or more related filings.

At block 814, new IA records may be created for the related filings. The new IA records may be at least partially based on tasks, the events, the common data, the priority dates, the due dates, the law firms, or any combination thereof. The new IA records may be created automatically or in response to some input by the IAM user. In some embodiments, the method 800 may include creating an IA record for the current filing based on obtained IA data. Additionally or alternatively, the method 800 may include obtaining IA data for the related filings. It may be determined whether errors are present in the obtained IA data for the related filings and the obtained IA data for the current filing. In response to a determination that one or more errors are present, the method 800 may include providing error details to the IAM user.

Figure 9:
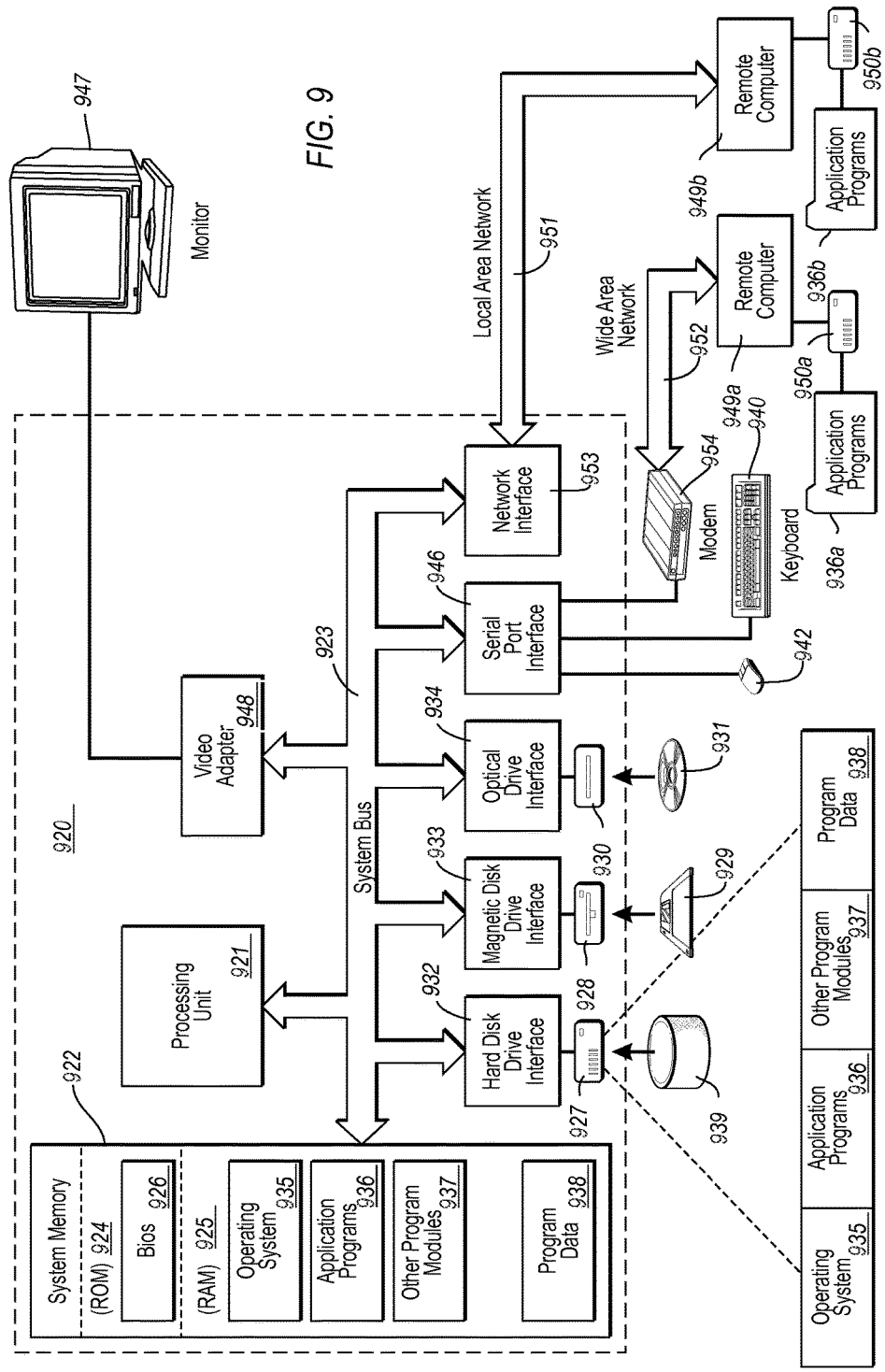
FIG. 9 illustrates a block diagram illustrating a suitable computing environment in which several embodiments may be implemented.

FIG. 9 and the following discussion are intended to provide a brief, general description of a suitable computing environment in which some embodiments described herein may be implemented. Although not required, some embodiments described herein may include computer-executable instructions, such as program modules, being executed by computers in network environments. Generally, program modules include routines, programs, objects, components, data structures, etc. that perform particular actions or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Some embodiments described herein may be practiced in network computing environments with many types of computer system configurations, including personal computers, mobile phones, handheld devices, mobile phones, multiprocessor systems, microprocessor-based or programmable consumer electronics, network PCs, minicomputers, mainframe computers, and the like. Some embodiments may also be practiced in distributed computing environments where actions are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 9, an example system including a general-purpose computing device in the form of a computer 920, including a processing unit 921, a system memory 922, and a system bus 923 that couples various system components including the system memory 922 to the processing unit 921.

As mobile phones become more sophisticated, mobile phones are beginning to incorporate many of the components illustrated for the computer 920. Accordingly, with relatively minor adjustments, mostly with respect to input/output devices, the description of the computer 920 applies equally to mobile phones. The system bus 923 may be any of several types of bus structures including a memory bus or memory controller, a peripheral bus, and a local bus using any of a variety of bus architectures. The system memory includes read only memory (ROM) 924 and random access memory (RAM) 925. A basic input/output system (BIOS) 926, containing the basic routines that help transfer information between elements within the computer 920, such as during start-up, may be stored in ROM 924.

The computer 920 may also include a magnetic hard disk drive 927 for reading from and writing to a magnetic hard disk 939, a magnetic disk drive 928 for reading from or writing to a removable magnetic disk 929, and an optical disc drive 930 for reading from or writing to a removable optical disc 931 such as a CD-ROM or other optical media. The magnetic hard disk drive 927, the magnetic disk drive 928, and the optical disc drive 930 are connected to the system bus 923 by a hard disk drive interface 932, a magnetic disk drive-interface 933, and an optical drive interface 934, respectively. The drives and their associated computer-readable media provide nonvolatile storage of computer-executable instructions, data structures, program modules, and other data for the computer 920. Although the exemplary environment described herein employs the magnetic hard disk 939, the removable magnetic disk 929, and the removable optical disc 931, other types of computer-readable media for storing data can be used, including magnetic cassettes, flash memory cards, digital versatile discs, RAMs, ROMs, and the like.

Program code means comprising one or more program modules may be stored on the magnetic hard disk 939, the removable magnetic disk 929, the removable optical disc 931, ROM 924, or RAM 925, including an operating system 935, one or more application programs 936, other program modules 937, and program data 938. A user may enter commands and information into the computer 920 through keyboard 940, pointing device 942, or other input devices (not shown), such as a microphone, joy stick, game pad, satellite dish, scanner, or the like. These and other input devices are often connected to the processing unit 921 through a serial port interface 946 coupled to system bus 923. Alternatively, the input devices may be connected by other interfaces, such as a parallel port, a game port, or a universal serial bus (USB). A monitor 947 or another display device is also connected to system bus 923 via an interface, such as video adapter 948. In addition to the monitor, personal computers typically include other peripheral output devices (not shown), such as speakers and printers.

The computer 920 may operate in a networked environment using logical connections to one or more remote computers, such as remote computers 949a and 949b. The remote computers 949a and 949b may each be a personal computer, a server, a router, a network PC, a peer device, or other common network node, and typically include many or all of the elements described above relative to the computer 920, although only memory storage devices 950a and 950b and their associated application programs 936a and 936b have been illustrated in FIG. 9. The logical connections depicted in FIG. 9 include a local area network (LAN) 951 and a wide area network (WAN) 952 that are presented here by way of example and not limitation. Such networking environments are commonplace in office-wide or enterprise-wide computer networks, intranets and the Internet.

When used in a LAN networking environment, the computer 920 is connected to the LAN 951 through a network interface or adapter 953. When used in a WAN networking environment, the computer 920 may include a modem 954, a wireless link, or other means for establishing communications over the WAN 952, such as the Internet. The modem 954, which may be internal or external, is connected to the system bus 923 via the serial port interface 946. In a networked environment, program modules depicted relative to the computer 920, or portions thereof, may be stored in the remote memory storage device.

The previously described embodiments have many advantages, including simplifying creation of a family of IA records, reducing IAM user data entry work, and improving data integrity. All advantageous features and all advantages need not be incorporated into every embodiment.

The embodiments described herein may include the use of a special-purpose or general-purpose computer including various computer hardware or software modules, as discussed in greater detail below.

Embodiments within the scope of the present subject matter also include tangible computer-readable media for carrying or having computer-executable instructions or data structures stored thereon. Such computer-readable media can be any available media that can be accessed by a general-purpose or special-purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general-purpose or special-purpose computer.

Computer-executable instructions comprise, for example, instructions and data which cause a general-purpose computer, special-purpose computer, or special-purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system, methods, and other means for accomplishing functions disclosed herein are preferably implemented in software, implementations in hardware or a combination of software and hardware are also possible and contemplated. In this description, a "computing entity" may be any computing system as previously defined herein, or any module or combination of modulates running on a computing system.

The present subject matter of the present application may be embodied in other specific forms. The described embodiments are to be considered in all respects only as illustrative and not restrictive.

What is claimed is:

1. A method for creating a family of related intellectual asset (IA) records with common data in a memory device of an intellectual asset management (IAM) server to improve data integrity of the family of related IA records, the method comprising:
    causing, by the IAM server, display of a IA record creation user interface (UI) object on a user device via a computer network;
    obtaining, by the IAM server, IA data for a current filing, at least a portion of the IA data being entered into the IA record creation UI object, the IA data being communicated to the IAM server via the computer network;
    creating, by the IAM server, an IA record in the memory device of the IAM server for the current filing based on the obtained IA data;
    causing, by the IAM server, display of a IA priority UI object on the user device via the computer network, the IA priority UI object including a parent table that specifies parent records to create;
    further obtaining, by the IAM server, IA data for one or more related filings listed in the parent table, wherein the IA data includes IA record links between the current filing and the one or more related filings that indicate that the current filing and the related filings belong to a family of intellectual assets;
    determining, by the IAM server, based on the IA record links, IA relationships between the current filing and the related filings, each of the IA relationships including a parent/child relationship, a foreign/domestic relationship, a continuation/parent relationship, a continuation-in-part/parent relationship, a nationalization relationship, a PCT/nationalization relationship, a PCT/priority relationship, or a provisional/non-provisional relationship;
    preparing for creation a plurality of new IA records for the one or more related filings based on the obtained IA data for the current filing and the obtained IA data for the one or more related filings, wherein the preparing includes automatically calculating priority dates and due dates for the related filings based on the determined relationship and the current filing and associating a law firm with the related filings;
    creating, by the IAM server, the plurality of new IA records in the memory device of the IAM server for the one or more related filings, the plurality of new IA records including the IA relationship, the calculated priority dates, the calculated due dates, and the associated law firm;
    determining, by the IAM server, the common data between the filing and the related filings, the common data including one or both of assignee data and inventor data;
    cascading, by the IAM server, the common data to the plurality of new IA records of the one or more related filings such that each of the plurality of new IA records includes the common data consistent with the current filing, wherein the cascading the common data includes sharing the common data of the IA record of the current filing with the new IA records of the one or more related filings;
    determining, by the IAM server, whether one or more errors are present in the IA data for the one or more related filings and the IA data for the current filing, wherein the errors include not specifying a first filing, not specifying an immediate parent, and adding a designated phase without having a corresponding parent; and
    in response to a determination that one or more errors are present, providing, by the IAM server, error details to an IAM user.

2. The method of claim 1, further comprising:
    determining whether an IAM user has selected to cancel the creation of the plurality of new IA records; and
    in response to a determination that the IAM user has selected to cancel the creation of the plurality of new IA records, deleting cached data including the IA data for the one or more related filings.

3. The method of claim 1, further comprising:
    confirming the law firm associated with the one or more related filings; and
    in response to an input by the IAM user, modifying the law firm associated with the one or more related filings.

4. The method of claim 3, wherein the associating the law firm includes designating one or more of a type, a jurisdiction, and a law firm.

5. The method of claim 1, wherein the preparing for creation of the plurality of new IA records includes:
    displaying a workflow report for the one or more related filings, wherein the workflow report includes actions related to prosecution of the one or more related filings that are based upon a preconfigured law or workflow; and
    receiving an IAM user input designating a subset of the actions to occur upon confirmation by the IAM user.

6. The method of claim 5, wherein the actions include:
    record information including informative details on a type of IA record and the preconfigured law or workflow associated with the IA record;
    a message including informative details of field values for the IA record based upon the preconfigured law or workflow associated with the IA record;
    events to be recorded in the IA record based upon the preconfigured law or workflow; and
    tasks to be created for the IA record based upon the preconfigured law or workflow.

7. The method of claim 6, wherein:
    the IA data of the one or more related filings include a jurisdiction, a first filing, and an application type; and
    the preconfigured law or workflow is determined based at least partially on one or more of the jurisdiction, the first filing, and the application type.

8. A method of intellectual asset (IA) record family creation in a memory device of an intellectual asset management (IAM) server to improve data integrity among the IA record family, the method comprising:
    causing, by the IAM server, display of a IA record creation user interface (UI) object on a user device via a computer network;
    obtaining, by the IAM server, IA data for a current filing, at least a portion of the IA data being entered into the IA record creation UI object, the IA data being communicated to the IAM server via the computer network;

creating, by the IAM server, an IA record in the memory device of the IAM server for the current filing based on the obtained IA data;

causing, by the IAM server, display of a IA priority UI object on the user device via the computer network, the IA priority UI object including a parent table that specifies parent records to create;

determining, by the IAM server, IA record links between a current filing and two or more related filings;

determining, by the IAM server, based on the IA record links, IA relationships between the current filing and the related filings, each of the IA relationships including a parent/child relationship, a foreign/domestic relationship, a continuation/parent relationship, a continuation-in-part/parent relationship, a nationalization relationship, a PCT/nationalization relationship, a PCT/priority relationship, or a provisional/non-provisional relationship;

automatically calculating, by the IAM server, priority dates and due dates for the related filings based on the determined relationship and the current filing;

associating, by the IAM server, a law firm with the related filings;

creating, by the IAM server, a plurality of new IA records for the related filings, the plurality of new IA records including the IA relationship, the calculated priority dates, the calculated due dates, and the associated law firm;

determining, by the IAM server, the common data between the filing and the related filings, the common data including one or both of assignee data and inventor data;

cascading, by the IAM server, the common data to the plurality of new IA records of the one or more related filings such that each of the plurality of new IA records includes the common data consistent with the current filing, wherein the cascading the common data includes sharing the common data of the IA record of the current filing with the new IA records of the one or more related filings;

creating, by the IAM server, a task for a first new IA record of the plurality of new IA records, the task including a request to file and to prosecute an IA application by the associated law firm according to the information in the first new IA record;

determining, by the IAM server, whether one or more errors are present in one or more of the obtained IA data for the one or more related filings and the obtained IA data for the current filing, wherein the errors include not specifying a first filing, not specifying an immediate parent, and adding a designated phase without having a corresponding parent; and in response to a determination that one or more errors are present, providing, by the IAM server, error details to an IAM user.

9. The method of claim 8, further comprising:
creating an IA record for the current filing based on obtained IA data; and
obtaining IA data for the one or more related filings.

10. The method of claim 9, wherein:
the IA data of the one or more related filings include a jurisdiction, a first filing, and an application type; and
a preconfigured law or workflow is determined based at least partially on one or more of the jurisdiction, the first filing, and the application type.

11. The method of claim 8, further comprising preparing for creation of the new plurality of IA records, wherein the preparing includes:
displaying a workflow report for the one or more related filings, wherein the workflow report includes a set of actions related to prosecution of the one or more related filings that are based upon preconfigured laws or workflow; and
receiving IAM user input designating a subset of the actions to occur upon confirmation by the IAM user.

12. The method of claim 11, wherein the actions include:
record information including informative details on a type of IA record and the preconfigured law or workflow associated with the IA record;
a message including informative details of field values for the IA record based upon the preconfigured law or workflow associated with the IA record;
events to be recorded in the IA record based upon the preconfigured law or workflow; and
tasks to be created for the IA record based upon the preconfigured law or workflow.

13. A non-transitory computer-readable medium having encoded therein programming code executable by one or more processors to perform operations for creating a family of related intellectual asset (IA) records with common data in a memory device of an intellectual asset management (IAM) server to improve data integrity of the family of related IA records, the operations comprising:
causing, by the one or more processors, display of a IA record creation user interface (UI) object on a user device via a computer network;
obtaining, by the one or more processors, IA data for a current filing, at least a portion of the IA data being entered into the IA record creation UI object, the IA data being communicated to the IAM server via the computer network;
creating, by the one or more processors, an IA record for the current filing in a memory device based on the obtained IA data;
causing, by the one or more processors, display of a IA priority UI object on the user device via the computer network, the IA priority UI object including a parent table that specifies parent records to create;
further obtaining, by the IAM server, IA data for one or more related filings listed in the parent table, wherein the IA data includes IA record links between the current filing and the one or more related filings that indicate that the current filing and the related filings belong to a family of intellectual assets;
determining, by the IAM server, based on the IA record links, IA relationships between the current filing and the related filings, each of the IA relationships including a parent/child relationship, a foreign/domestic relationship, a continuation/parent relationship, a continuation-in-part/parent relationship, a nationalization relationship, a PCT/nationalization relationship, a PCT/priority relationship, or a provisional/non-provisional relationship;
determining, by the one or more processors, whether one or more errors are present in one or more of the obtained IA data for the one or more related filings and the obtained IA data for the current filing;
in response to a determination that one or more errors are present, providing, by the one or more processors, error details to an intellectual asset management (IAM) user;
preparing for creation a plurality of new IA records for the one or more related filings based on the obtained IA data for the current filing and the obtained IA data for the one or more related filings, wherein the preparing includes automatically calculating priority dates and due dates for the related filings based on the determined relationship and the current filing and associating a law firm with the related filings;

creating, by the IAM server, the plurality of new IA records in the memory device of the IAM server for the one or more related filings, the plurality of new IA records including the IA relationship, the calculated priority dates, the calculated due dates, and the associated law firm;

determining, by the IAM server, the common data between the filing and the related filings, the common data including one or both of assignee data and inventor data;

cascading, by the one or more processors, the common data to the plurality of new IA records of the one or more related filings such that each of the plurality of new IA records includes the common data consistent with the current filing, wherein the cascading the common data includes sharing the common data of the IA record of the current filing with the new IA records of the one or more related filings;

determining, by the one or more processors, whether one or more errors are present in the IA data for the one or more related filings and the IA data for the current filing, wherein the errors include not specifying a first filing, not specifying an immediate parent, and adding a designated phase without having a corresponding parent; and in response to a determination that one or more errors are present, providing, by the one or more processors, error details to an IAM user.

14. A non-transitory computer-readable medium of claim 13, wherein the operations further comprise:
determining whether the IAM user has selected to cancel the creation of the plurality of new IA records; and
in response to a determination that the IAM user has selected to cancel the creation of the plurality of new IA records, deleting cached data including the IA data for the one or more related filings.

15. A non-transitory computer-readable medium of claim 13, wherein:
the associating includes designating one or more of a type, a jurisdiction, and a law firm; and
the operations further comprise:
confirming the law firm associated with the one or more related filings; and
in response to an input by the IAM user, modifying the law firm associated with the one or more related filings.

16. The non-transitory computer-readable medium of claim 13, wherein the preparing for creation of the plurality of IA records includes:
displaying a workflow report for the one or more related filings, wherein the workflow report includes actions related to prosecution of the one or more related filings that are based upon a preconfigured law or workflow; and
receiving the IAM user input designating a subset of the actions to occur upon confirmation of by the IAM user.

\* \* \* \* \*